United States Patent [19]

Kenyon

[11] 4,314,339

[45] Feb. 2, 1982

[54] METHOD OF GENERATING SUBSURFACE CHARACTERISTICS MODELS

[75] Inventor: William E. Kenyon, Houston, Tex.

[73] Assignee: Schlumberger Limited, New York, N.Y.

[21] Appl. No.: 19,925

[22] Filed: Mar. 12, 1979

Related U.S. Application Data

[63] Continuation of Ser. No. 177,941, Sep. 7, 1971, abandoned.

[51] Int. Cl.$^3$ .................. G06F 15/20; E21B 47/00
[52] U.S. Cl. ................... 364/422; 324/323; 324/339; 324/351
[58] Field of Search ............ 364/421, 422; 340/18 R, 340/860; 324/1, 6, 323, 339, 351; 73/151, 153

[56] References Cited

U.S. PATENT DOCUMENTS

| | | | |
|---|---|---|---|
| 3,166,709 | 1/1965 | Doll | 324/1 X |
| 3,405,349 | 10/1968 | Moran | 340/18 R X |
| 3,457,496 | 7/1969 | Schuster | 324/1 |
| 3,457,497 | 7/1969 | Schuster | 324/1 |
| 3,457,499 | 7/1969 | Tanguy | 324/1 |
| 3,457,500 | 7/1969 | Schuster | 324/1 |

Primary Examiner—Jerry Smith
Attorney, Agent, or Firm—Cooper, Dunham, Clark, Griffin & Moran

[57] ABSTRACT

A method of computer generating a subsurface characteristic model which is substantially consistent with readings taken in a well with the well logging device. A set of actual measurement values which represent readings taken over a given depth interval of the well is derived. An initial trial model of the subsurface characteristic under investigation is then selected. The model includes discretely-boundaried beds, the location of boundaries being based on subsurface characteristic data. A simulated measurement value at a particular depth level is generated by applying the approximate response characteristic of the logging device to the model. The simulated measurement value at the particular depth level is compared to the actual measurement value at that depth level and the model is then modified in accordance with the comparison. In a preferred embodiment of the invention, the location of model boundaries are determined by computing the variance of subsurface characteristic data and then selecting model boundaries at local maxima of the variance.

39 Claims, 17 Drawing Figures

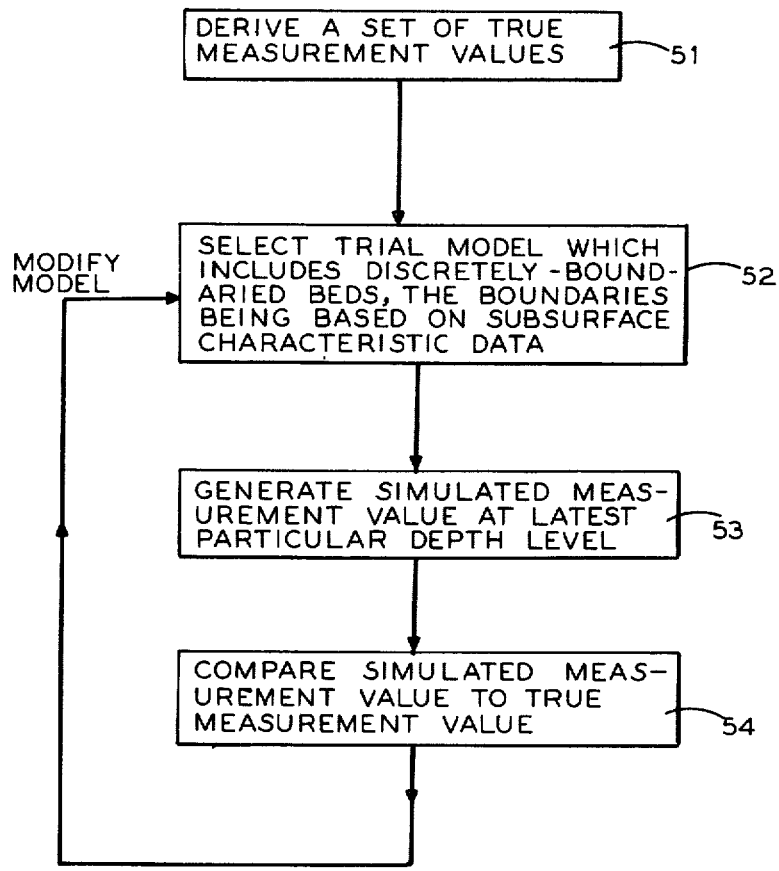

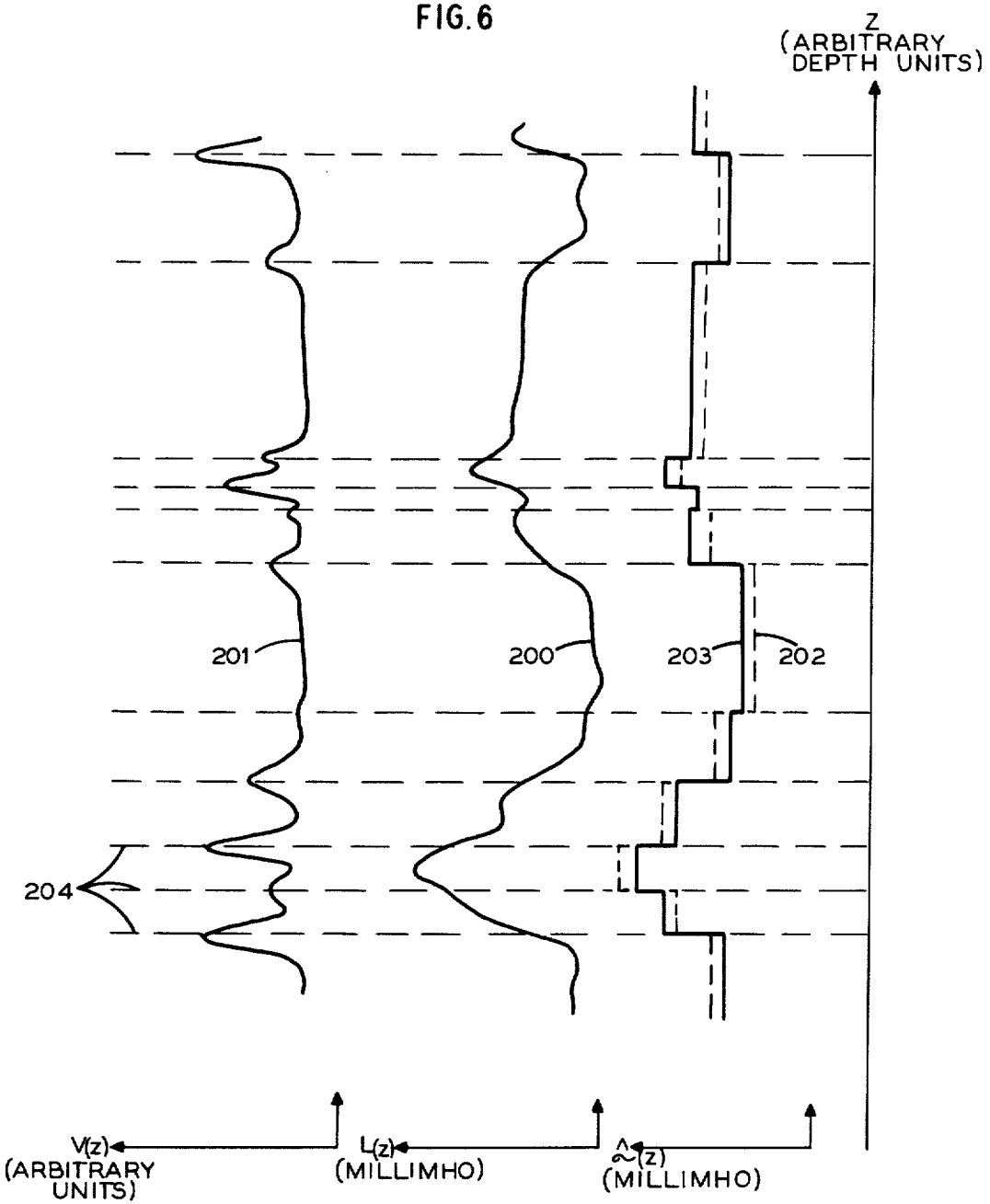

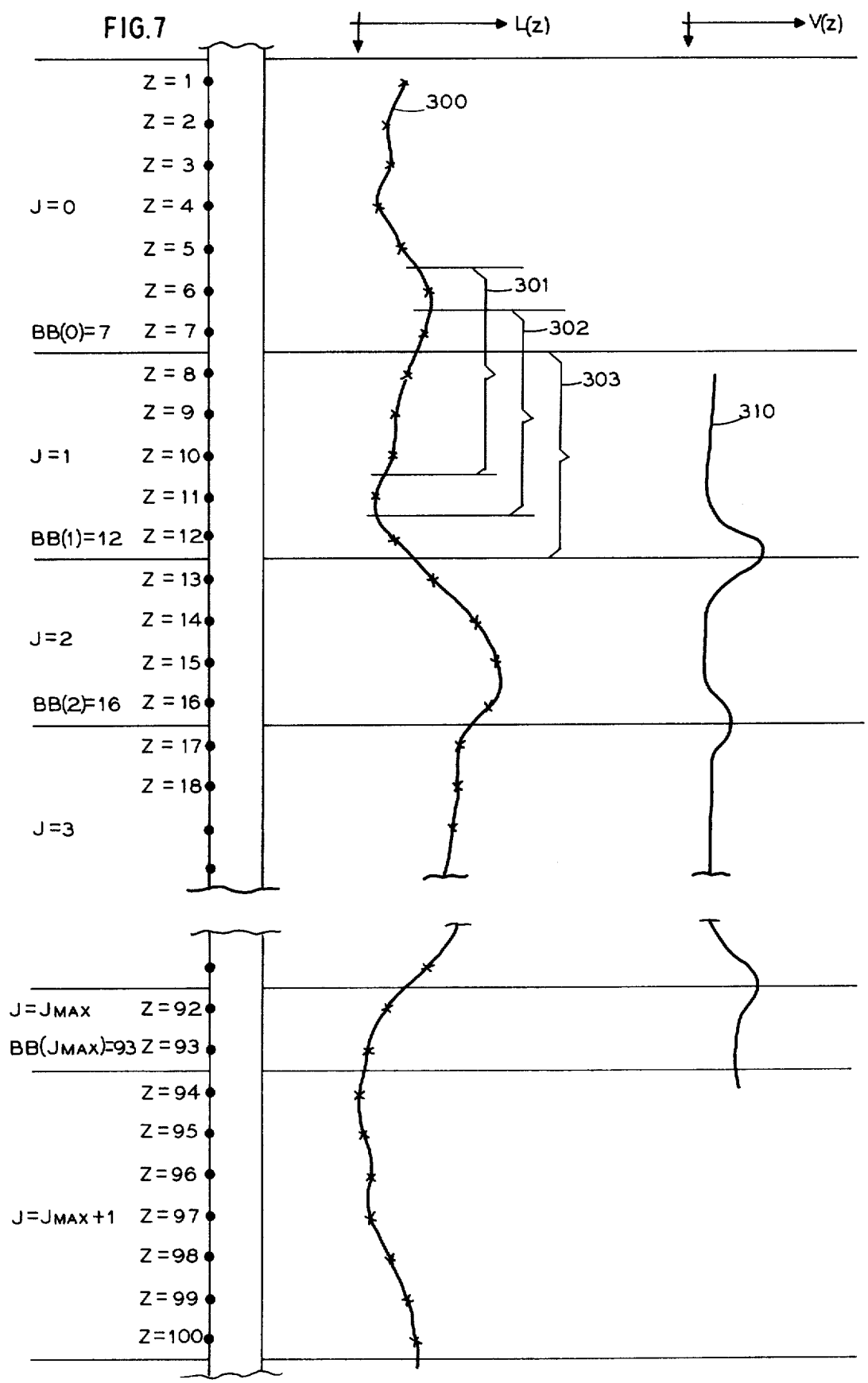

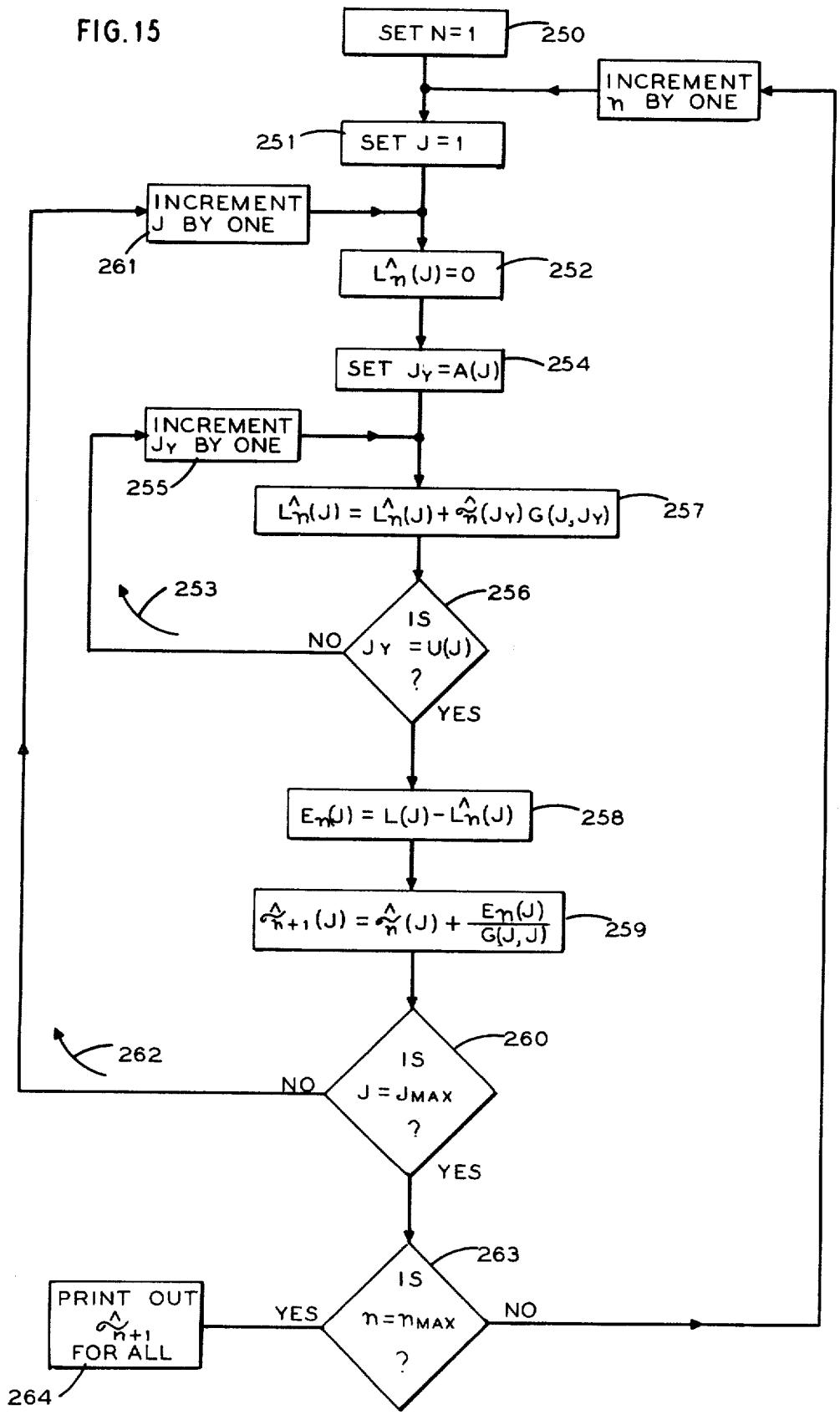

METHOD OF GENERATING SUBSURFACE CHARACTERISTICS MODELS

This is a continuation, of application Ser. No. 177,941 filed Sept. 7, 1971 and now abandoned.

BACKGROUND OF THE INVENTION

This invention relates to methods for generating models of the subsurface characteristics of a well and, more particularly, to a method of generating a subsurface characteristic model which is consistent with readings taken in a borehole with a well logging device.

The subject matter of this invention is related to subject matter disclosed in the following U.S. Patent Applications, each filed of even date herewith and assigned to the same assignee as the present invention: U.S. application Ser. No. 019,918 of F. Segesman; U.S. application Ser. No. 019,926 of C. Regat; and U.S. application Ser. No. 019,917 of J. Suau and W. Frawley.

In the drilling of an oil or gas well it is advantageous to obtain as much information as possible about the nature of the formations or beds surrounding the drilled borehole. To this end, well logging devices are lowered into the borehole to measure various characteristic properties of surrounding formations. In electrical logging, for example, a device which includes an electrical sensor is moved through the borehole and provides indications of the electrical resistivity or conductivity of the subsurface materials at different depth levels.

For many well logging applications it is desirable that the logging device respond only to a very limited portion of the formation material; i.e., the portion that is adjacent the device at the time a measurement is taken. This is not easily accomplished, however. Ideally, it would be desirable for the vertical resolution of the device to be sharpened such that the apparatus will respond to formation material only over a vertical interval of very narrow extent. This would enable relatively thin beds to be more readily distinguished and their characteristics to be more accurately measured. At the same time, it is often desirable for the logging device to have a reasonably extensive capability of investigation in a horizontal or radial direction. Not surprisingly, the two considerations are found to be countervailing.

Consider, as an example, the type of well logging apparatus known as an "induction logging" device which includes, inter alia, transmitter and receiver coils mounted in spaced relation on a sonde. Alternating current is applied to the transmitter coil and the alternating magnetic field thereby created generates eddy currents in the formations surrounding the borehole. The eddy currents, in turn, create a secondary magnetic field which induces an electromotive force in the receiver coil. The intensity of the eddy currents is a function of the formation conductivity which can therefore be measured by monitoring the induced electromotive force. The basic principles of induction logging are described in an article by H. G. Doll entitled "Introduction to Induction Logging and Application to Logging of Wells Drilled with Oil Base Mud" which appeared in the June, 1949 issue of the Petroleum Transactions of the AIME. Among the techniques which have been devised for sharpening (or "focusing") the vertical response of induction logging devices is to provide additional coils on the sonde. These "focusing coils" are utilized in phased relationship with the basic transmitter and receiver coils to effectively cancel portions of the device response which are above and below the central investigative region of the device. Unfortunately, the use of numerous additional coils in this manner tends to significantly decrease the horizontal range of the device, so there is a practical limit on the degree of such focusing which can be employed. Also, the required additional elements render the device more complex and expensive.

In addition to focusing methods which relate to the overall response characteristic of the downhole device, there have been previously developed vertical resolution improvement methods which are termed "computed focusing" techniques. Generally speaking, computed focusing techniques utilize signals which are, at a given instant, more representative of the formation material in the undesired regions to adjust or correct the signal which is at the same instant, more representative of the desired region. Computed focusing techniques are described, for example, in U.S. Pat. No. 3,166,709 of H. G. Doll, U.S. Pat. No. 3,230,445 of W. J. Sloughter et al, and U.S. Pat. No. 3,457,496 of N. Schuster. These patents describe systems that receive signals for a downhole sensing device and generate computed signals which approximate the response that would have been obtained from a sensing device having a sharper response characteristic. Each of the referenced patents discloses a relatively uncomplicated analog apparatus which can be utilized at a wellsite to produce an on-the-spot log. The apparatus temporarily stores signals obtained at various vertically spaced levels in a borehole and then combines the stored signals in appropriate manner to obtain effective log readings with improved vertical resolution.

While the signal processing techniques disclosed in the referenced patents provide useful results, the logs produced with these techniques nonetheless represent subsurface readings taken with a device having an effective response of substantial (though improved) vertical extent. To visualize the actual subsurface characteristics which, when measured, had produced the log, one must still take into account this effective response. Accordingly, it is one of the objects of the present invention to provide a method for generating a subsurface characteristic model which is consistent with readings taken with a device having an effective response of substantial vertical extent.

SUMMARY OF THE INVENTION

The present invention is directed to a method for generating a subsurface characteristic model which is substantially consistent with readings taken in a well with a well logging device. The method is preferably implemented by utilizing a general purpose digital computer which may typically be located at a site which is distant from the well.

In the above-referenced copending application of Segesman there is disclosed a method for computer generating a useful subsurface characteristic model. An embodiment of the Segesman method can be described briefly as follows: A set of actual measurement values which represent readings taken over a given depth interval of a well is derived. An initial trial model of the subsurface characteristic under investigation is then selected. The model consists of a plurality of beds of equal thickness distributed over the given depth interval. A set of simulated measurement values is generated by applying the approximate response characteristic of the logging device to the discrete trial model. The simulated measurement values are compared with the actual measurement values and the initial trial model is then modified in accordance with the comparison. The modified trial model is next utilized to form a new set of simulated measurements which are, in turn, compared with the true measurement values. The model can then be remodified and the procedure continued in iterative fashion until there is obtained a model which yields acceptable simulated measurement values; i.e., simulated measurement values which approximately correspond to the actual measurement values. When such a model is obtained, there is good indication that the model values are a useful approximation of the subsurface characteristic being investigated.

The method of the present invention similarly utilizes a model of the subsurface characteristic from which simulated measurement values are generated and then examined with a view toward modifying the model. However, the model of the present invention includes discretely-boundaried beds, the location of boundaries being based on subsurface characteristic data. In a preferred embodiment of the invention, the locations of model boundaries are determined by computing the variance of subsurface characteristic data and then selecting model boundaries at local maxima of the variance.

Further features and advantages of the invention will be better understood from the following detailed description when taken in conjunction with the accompanying drawings.

BRIEF DESCRIPTION OF THE DRAWINGS

FIG. 5 is a simplified block diagram of the invented method;

FIG. 6 shows a group of curves which help illustrate the method of the invention;

FIG. 7 shows a log of subsurface conductivity readings and the manner in which such readings are used in determining model bed boundaries;

FIG. 15 is a flow diagram for machine programming an iterative method in accordance with an embodiment of the invention.

DESCRIPTION OF THE PREFERRED EMBODIMENT

Figure 1:
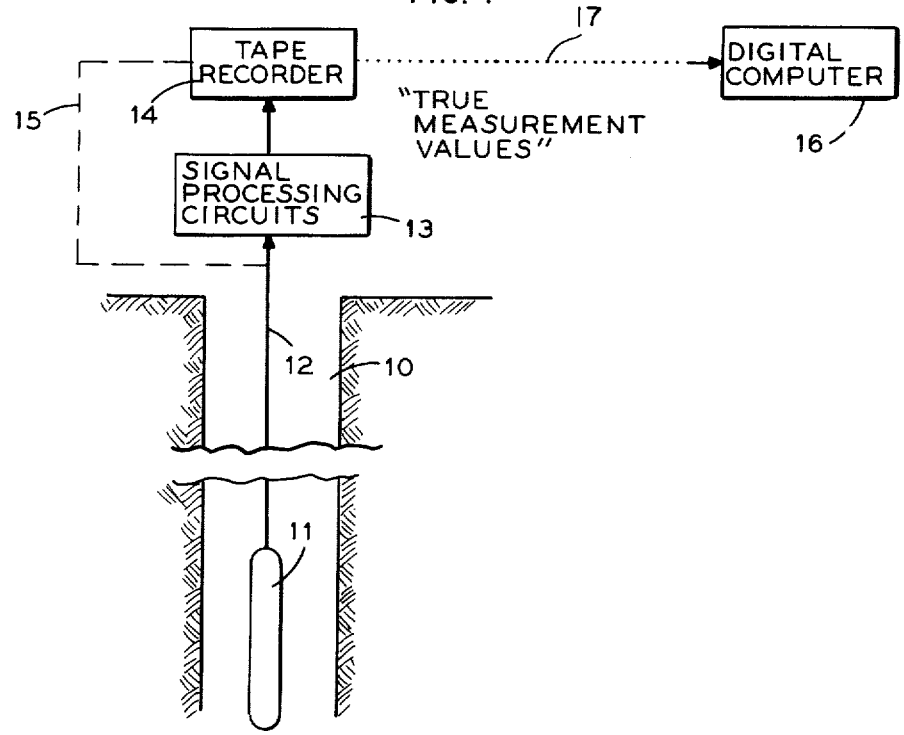
FIG. 1 is a functional diagram of a system for producing and processing well logging measurements representative of the subsurface characteristics of a well.

Referring to FIG. 1, there is shown a functional diagram of a system for producing and processing well logging measurements representative of the subsurface characteristics of a well or borehole 10. An investigating device 11 is suspended in the borehole on a cable 12. The length of the cable 12, which determines the relative depth of device 11, is controlled by suitable mechanical depth control means such as a drum and winch mechanism (not shown). The signals from investigating device 11 are coupled via cable 12 to signal processing circuitry 13 which, inter alia, converts the signals to a digital form for recording on a tape recorder 14. As is conventionally practiced, the tape recorder 14 is synchronized with the depth control means, such synchronization being depicted in FIG. 1 by the dashed linkage 15. The digital signals recorded on tape represent measurements taken at various depths in the borehole, typically measurements taken at six inch sampling intervals. The taped measurements are carried or transmitted via communications link to a computer center and entered in a prescribed fashion in a digital computer 16, as is represented by the dotted arrow 17. The computer 16 receives as an input a "derived" set of "true measurement values".

As defined herein, "true measurement values" is a generic term which describes the readings taken in a well with a well logging device. The readings may relate to any type of subsurface characteristic, but most typically would relate to conductivity or resistivity. The readings may be subject to little or no signal processing or to complex processing, coding/decoding or the like. For example, the readings may be utilized in the very form in which they are received from a simple logging device. On the other hand, the readings may be subjected to computed focusing techniques (referenced above), encoding for recording and transmission, decoding, etc., before being entered in the computer. In any event, the "true measurement values" represent, in some form, actual measurements taken in a well or borehole. The contrast of this term with the term "simulated measurement values" will become later apparent.

The term "deriving" as used herein, is also generic and is intended to include in its definition the acts of measuring or of recovering measurements previously taken. In the simplest sense, therefore, the "deriving" of measurements may consist merely of measuring well log readings. On the other hand, the deriving of measurements may consist, for example, of recovering previously taken well log readings from a recording tape or from the receiver of a communications link.

It should be noted here that the particular type of logging device, signal processing circuitry, and recording and communications means utilized to obtain true measurement values is a matter of convenient choice. Indeed, if an appropriate computer were available at the wellsite it would be possible to enter measurement values directly without recording or transmitting these values. As will become understood, the principles of the invention are applicable to different types of true measurement values having a variety of past histories. For ease of illustration, however, let us assume that the device of FIG. 1 is of the conventional induction logging type which measures conductivity (or resistivity), that no computed focusing techniques are employed in the signal processing circuits 13, and that the measurement values recorded on tape are carried to the location of a general purpose digital computer.

In the discussion that follows, use will be made of diagrams representing the cross-section of the ground intercepted by a vertical plane containing the axis of a borehole. Each "region" of ground—which means here a volume of ground having a symmetry of revolution around the borehole—will be represented on such diagrams by its cross-section by the plane of the figure. When dealing with the response of a borehole investigating device it is convenient to make use of a descriptive vehicle known as the "vertical geometrical factor." The vertical geometrical factor, and especially its application to induction logging devices, is explained in the above-referenced Doll article and the above-referenced patents of Doll, Sloughter and Schuster. The vertical geometrical factor takes into quantitative account the fact that the sensitivity region of a logging device positioned at a given measure point actually extends over a substantial vertical region above and below such measure point. The vertical geometrical factor effectively "weights" the contributions to overall device response of different layers of ground depending on their vertical distance from the measure point.

Figure 2:
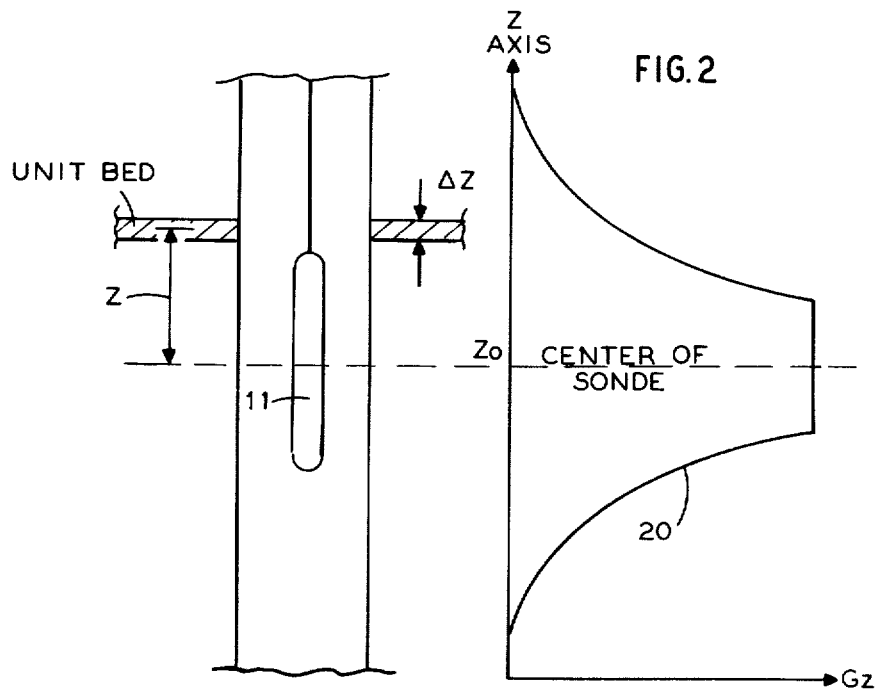
FIGS. 2 and 3 are representations of the response characteristic of well logging devices which are helpful in describing the concept of vertical geometrical factor.

An understanding of the vertical geometrical factor associated with an induction logging device can be gained with the aid of FIG. 2 which depicts an induction sonde positioned at a depth $z_o$ (as determined by the center or so-called "measure point" of the sonde). Assume that all space around the borehole is divided into an infinite number of horizontal beds of minute thickness $\Delta z$, each referred to as a "unit bed" and characterized by its altitude z with respect to the measure point, $z_o$. The vertical geometrical factor of each unit bed (i.e., its contribution to device response) is designated $G_z$, and the curve 20 is an approximate plot of the $G_z$'s vs. z for a typical induction logging device. The curve 20, referred to as the "vertical investigation characteristic" of the device, is normalized to unity by setting $$\sum_{\text{All } \Delta z} G_z \Delta z = 1,$$

or, in the limit as $\Delta z \to 0$, $$\int_{-\infty}^{+\infty} G_z dz = 1.$$

Figure 3:
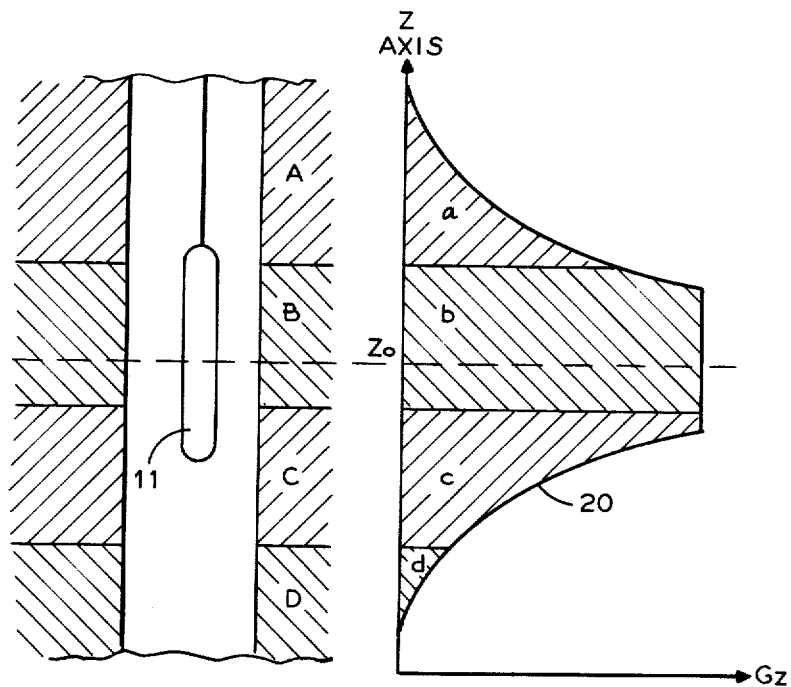

Consider, now, the four beds, A, B, C and D, of finite thickness shown in FIG. 3. The vertical geometrical factors of the beds, $G_A$, $G_B$, $G_C$ and $G_D$ are equal to their corresponding relative areas under the curve 20, i.e.:

$$G_A = \frac{a}{a+b+c+d}$$

$$G_B = \frac{b}{a+b+c+d}$$

$$G_C = \frac{c}{a+b+c+d}$$

-continued $$G_D = \frac{d}{a+b+c+d}$$

In view of the normalization just mentioned, $a+b+c+d$ equals one, so that $G_A = a$, $G_B = b$, $G_C = c$ and $G_D = d$. Now, if we designate $\sigma_A$, $\sigma_B$, $\sigma_C$ and $\sigma_D$ as the four bed conductivities, the response $L(z_o)$ of the logging device 11 at the depth $z_o$ (i.e., the measured log reading at that depth) can be expressed as $$L(z_o) = G_A \sigma_A + G_B \sigma_B + G_C \sigma_C + G_C \sigma_D \tag{1}$$

or, $$L(z_o) = a\sigma_A + b\sigma_B + c\sigma_C + d\sigma_D \tag{1a}$$

Generally, the response of the logging device at a depth z is $$L(z) = \Sigma G_i \sigma_i \tag{2}$$

where the summation is taken over all beds falling within the response range of the device, and the $\sigma_i$'s and $G_i$'s are the respective conductivities and vertical geometrical factors of these beds. As stated, the vertical geometrical factor of a particular bed is seen to be dependent upon the location of the bed with respect to the device's measuring point. For example, in FIG. 3, if the device were moved to an altitude slightly above $z_o$, the vertical geometrical factor of bed A (viz., area a) would become larger while the vertical geometrical factor of bed D (viz., area d) would become smaller.

The problem associated with utilizing a device having a relatively wide vertical response, as previously discussed, should now be readily apparent. For example, referring again to FIG. 3, the measure point $z_o$ of device 11 is located in the approximate center of bed B and, ideally, the device should be indicating a reading which only reflects the conductivity, $\sigma_B$, of bed B. However, the reading indicated by the logging device will, in reality, be determined by equation (1) or (1A) wherein $L(z_o)$ depends upon the conductivities $\sigma_A$, $\sigma_C$ and $\sigma_D$ as well as upon $\sigma_B$. It should be noted in this context that the relative width of the device response must be considered with relation to the width or thickness of the beds being examined. This can be illustrated, for instance, by considering the case where bed B is relatively wide and extends over the entire depth interval depicted in FIG. 3. In such case the reading taken at $z_o$ would be equal to $G_B \sigma_b$, there being no other beds lying within the device response curve. Also, due to the unity normalization of the vertical geometrical factor, $G_B$ would equal one so that the logging device would indicate a reading which substantially equals $\sigma_B$, the actual conductivity of bed B. Unfortunately, formation beds encountered in real-life situations are often substantially thinner than the effective device response width.

The technique of the present invention enables determination of a useful model of subsurface bed conductivity values notwithstanding the vertical resolution limitations of well logging devices. In obtaining a meaningful model it is helpful to assume that the subsurface formations being studied consist of well-defined beds of finite width each having a conductivity (or other measured parameter) which is essentially constant within the bed.

Such simplifying assumptions are not strictly accurate, of course, since formation beds deposited by nature are not exactly homogeneous and well defined. Stratified geological models of the type utilized herein are, however, generally consistent with natural depositional considerations and are expedient since exact geological solutions are not feasible in a practical sense.

Figure 4A:
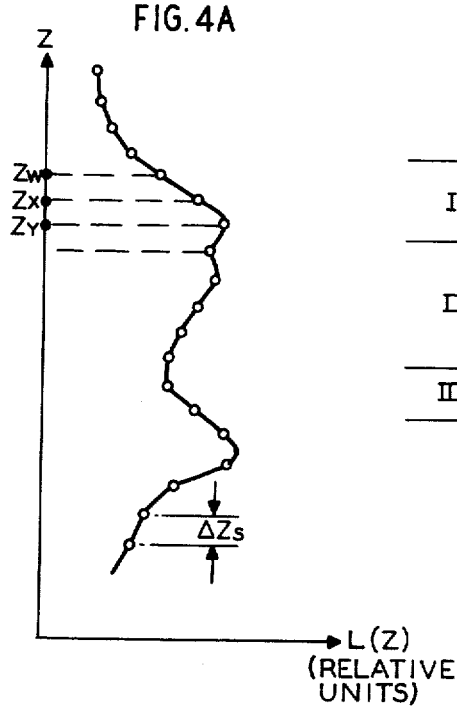
FIG. 4A is a log of conductivity readings taken at specified sampling intervals.

The tape of recorder 14 of FIG. 1 has recorded thereon a set of true measurement values taken over a given depth interval of the well 10. Referring to FIG. 4A, there is illustrated a "log" of conductivity readings L(z) taken at sample intervals denoted $\Delta z_s$. As was previously indicated, $\Delta z_s$ is typically six inches, but it will become clear that the method of the invention is not dependent upon the sampling interval and, for example, readings derived from a "continuous" log could be readily utilized herein. (The resolution of the original log is, however, limited by the sampling interval, so an unduly large sampling interval is not desirable.)

Figure 4B:
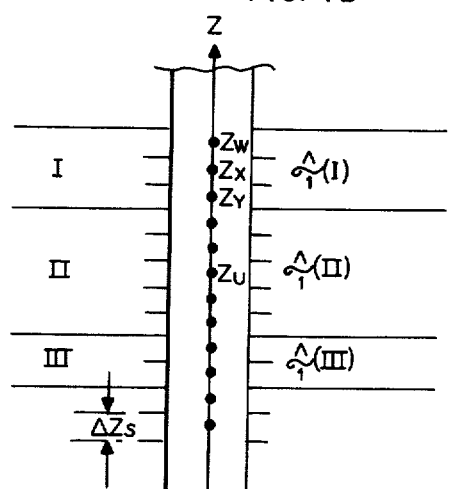
FIG. 4B is a model of subsurface formations, the model being of the type utilized in the present invention.

Referring to FIG. 5, there is shown a simplified block diagram of the method of the present invention. The block 51 represents the step of deriving a set of true measurement values taken with a well logging device. The true measurement values may be, for example, the readings as a function of depth depicted by the points of FIG. 4A. These true measurement values are stored in the memory of a digital computer. The next step, as represented by the block 52, is to select a trial model of the subsurface characteristic surrounding the well being investigated. The trial model includes discretely-boundaried beds, the locations of boundaries being based on subsurface characteristic data. In the present embodiment the original model is formed by the computer from the true measurement values and stored therein, but an externally generated model could, if desired, be read into computer memory. (Also, it will be appreciated that the original model may, if desired, be based on data from the well which is other than the true measurement values, such as data taken with a different logging device. This technique would, however, require accurate depth matching of logs.) In FIG. 4B, a portion of a model of subsurface formations is illustrated as consisting of a plurality of beds, each bed containing an integral number of sample intervals $\Delta z_s$. For example, the model bed I is three sample intervals wide and contains the depth levels $z_w$, $z_x$ and $z_y$ at which true measurement values had been taken. Similarly, the beds II and III are shown as respectively containing five and two depth level measure points. Each bed is assumed to have a homogeneous conductivity throughout its volume generally designated as $\hat{\sigma}_1(J)$ for a bed J of the original model. As will be later described in detail, the locations of model boundaries are preferably determined by computing the variance of subsurface characteristic data and then selecting model boundaries at local maxima of the variance.

Returning to FIG. 5, the next step of the method, represented by the block 53, is to generate a simulated measurement value at a particular depth level within the depth interval under consideration. This is accomplished by applying the approximate response characteristic of the logging device to the model. As used herein for purposes of this step, the term "response characteristic of the logging device" is intended to reflect the overall response of the equipment used to obtain the true measurement values; i.e., the downhole device and any auxiliary equipment such as computed focusing devices and the like. In the illustrative situation of FIG. 1, the induction logging device 11 is assumed to have an approximate vertical response characteristic of the form shown in FIG. 2. For other types of equipment, the approximate response curve may be sharper or broader or, perhaps, asymmetrical.

The simulated measurement value is generated by programming the computer to calculate a value at the particular depth level of interest, the calculation being performed in accordance with the above equation (2). This value is compared with the true measurement value at the particular depth level (block 54), and the model is modified in accordance with the comparison. In the present embodiment, this is achieved by modifying the conductivity of the model bed in which the particular depth level is located, the particular depth level having preferably been chosen as one which is centrally positioned in the bed. Thus, for example, in FIG. 4B a simulated measurement (based on the model $\hat{\sigma}_1$) at the depth level $z_x$ would be calculated and compared with the true measurement value at $z_x$. The model bed which contains $z_x$, i.e., bed I, is then modified in accordance with the comparison (in a manner to be specifically described hereinafter) to yield an "enhanced" model bed conductivity designated as $\hat{\sigma}_2(I)$. A new particular depth level, e.g. $z_u$ in the center of bed II, is next considered, and the process repeated at this depth level to yield an enhanced model bed conductivity $\hat{\sigma}_2(II)$. This procedure is continued as particular depth levels in each model bed are considered and enhanced conductivity values $\hat{\sigma}_2(J)$ are successively calculated for each bed. The process can then be repeated in iterative fashion by again considering each bed in the new model and recomputing further enhanced conductivity values.

Referring to FIG. 6, there is shown a group of curves which illustrate the method as set forth in the block diagram of FIG. 5. The center curve 200 represents a plot of true measurements, designated L(z), as taken with an induction type well logging device. The curve 201 is a plot of the variance, designated V(z), of the curve 200. Local maxima in the variance curve are indicated by dashed lines 204 which are used to define the depth levels at which model boundaries are selected. An initial conductivity value is chosen (in a manner to be described) for each model bed to obtain a "rectangularized" initial model as shown by the dotted curve 202. The model conductivity within each bed is then "enhanced" to obtain the solid curve 203 which represents the final approximation of the subsurface conductivities which had given rise to the true measurement curve 200. Ideally, if the response characteristic of the logging device was applied (in the simulated sense) to the rectangularized model 203, the curve obtained should closely approximate the true measurement curve 200. If so, there would be good indication that the final model is a useful approximation of the subsurface conductivity being investigated.

The method of this embodiment will now be described in further detail. As was indicated above, it has been found that a useful approach for the location of the approximate bed boundaries is to derive a secondary curve from the true measurement values by calculating the variance within a "window" of preselected size and then to locate maxima in the plot of such variance. The local maxima in the variance curve are selected as bed boundaries. The technique of boundary selection is illustrated with the aid of FIG. 7 wherein there is shown a curve 300 which consists of measurements L(z) taken with a logging device over a given depth interval that is depicted as including 100 data points extending from a depth level $z=1$ to a depth level $z=100$. In the illustration, the variance is calculated over a "window" of 5 depth units which means that each variance calculation reflects the activity over a particular group of 5 adjacent log readings. For example, the bracket 301 includes the 5 data points ($z=6$ through $z=10$) which are utilized in calculating the variance at the central depth level $z=8$. Similarly, the brackets 302 and 303 show the 10 data points which are included in calculating the variance at the depth levels $z=9$ and $z=10$. The curve 310 is a plot of the variance calculated over the depth levels between $z=8$ and $z=92$. Boundaries are selected from the variance curve 310 by choosing a boundary whenever a "local maximum" in the variance curve is observed. A local maximum in the variance curve is defined as a data point having a variance which is greater than the variance at either of its adjacent neighbors.

The window size of FIG. 7 encompasses 5 data points, but it will be appreciated that larger or smaller window sizes can be utilized if desired. Generally, the variance curve is found to become smoother as the size of the window is increased. For a window of M data points the variance at a given depth level can be defined by the equation $$V(z) = 1/M \Sigma ([L(i)]^2 - [L(z)]^2) \qquad (3)$$

where $L(z) = 1/M \Sigma L(i)$
and both summations are taken over all depth levels i in the window. For the case of FIG. 7, M is set equal to 5. Thus, for example, the variance at the depth level $z=8$, can be calculated by first computing the average of the log readings in the window $z=6$ through $z=10$ and then at each depth level in the window subtracting the square of this average value from the square of the log reading at the particular depth level. The sum of this difference taken over the window and divided by the number of depth level points in the window gives the variance at the center of the window, $z=8$. For reasons which will become later apparent, the variance for the data of FIG. 7 is calculated for only the range of $z=8$ to $z=92$.

Figure 8:
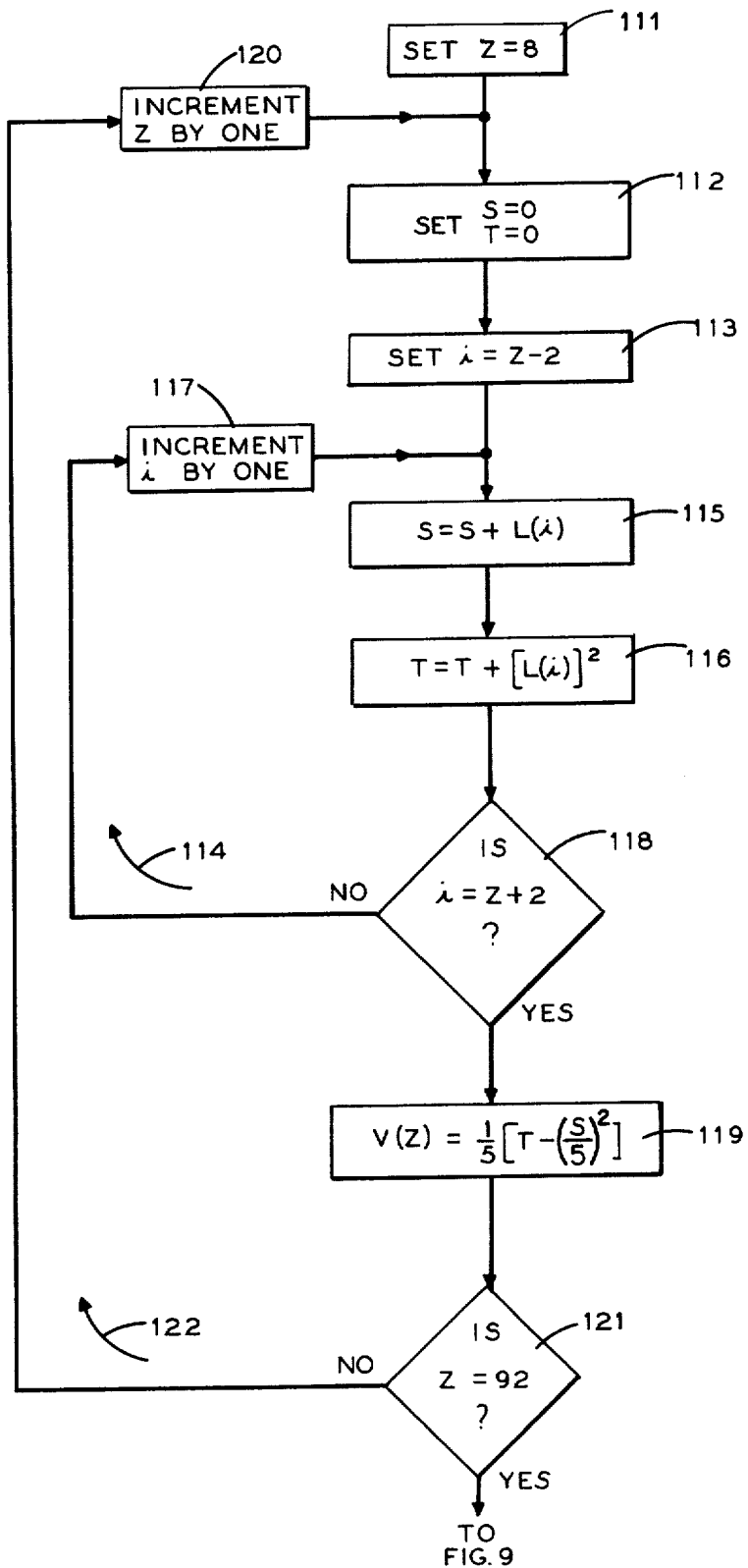
FIG. 8 is a flow diagram for machine programming the computation of variance values utilized in determining model bed boundaries.

Referring to FIG. 8 there is shown a flow diagram for machine programming the computation of variance for the interval under consideration in FIG. 7. The depth level index, z, is set equal to 8 (block 111) and the dummy variables S and T are initialized at 0 (block 112). For the calculation of variance at each point, the dummy variable S is utilized in calculating $\overline{L}(z)$ and the dummy variable T is utilized in calculating the quantity $\Sigma [L(i)]^2$. The variable i is set to $z-2$ (block 113), i.e., two depth levels above the depth level at which the variance is being calculated at the particular time. The quantities S and T are next calculated by action of a loop which is indicated by the loop arrow 114 as follows: The value of S is increased by an amount $L(i)$ (block 115), the value of T is increased by an amount $[L(i)]^2$ (block 116) i is successively incremented by one (block 117), and the loop 114 continues until i is equal to the last depth level in the window, i.e., $i = z+2$ (block 118). The value of the variance for the particular depth level under consideration, V(z), is next calculated in accordance with the block 119 as $$V(z) = 1/5 [T - (S/5)^2]$$

which is equivalent to the quantity indicated by the above equation (3). The value of V(z) is calculated for each depth level in the range $z=8$ to $z=92$ (block 120 and decision diamond 121) by action of the main loop 122.

Figure 9:
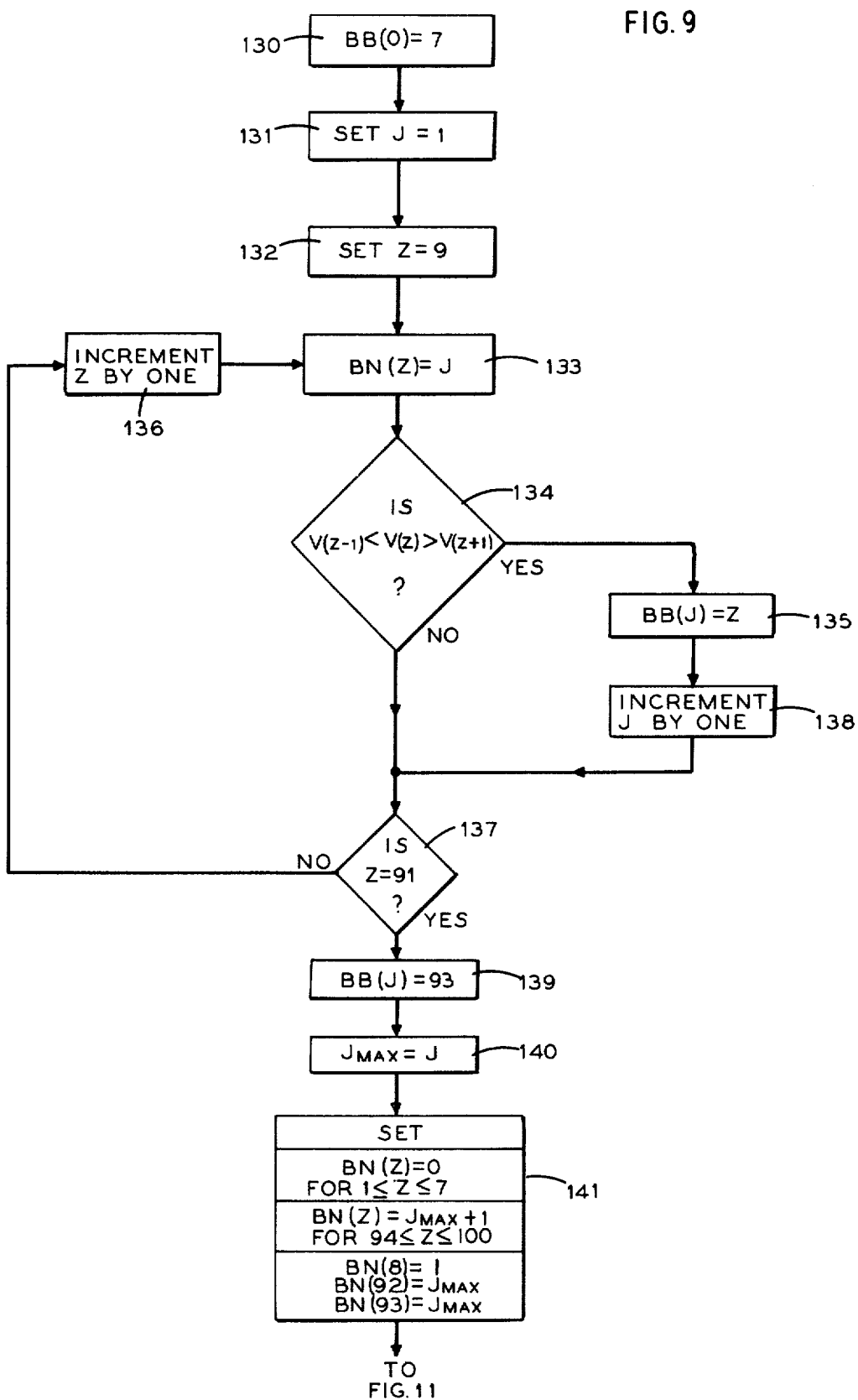
FIG. 9 is a flow diagram for machine programming the selection of bed boundaries.

In setting up boundaries it is helpful to utilize a "bed boundary" index, BB(J), which designates the depth level of the lower boundary of the bed J. In FIG. 7 a top "end bed" is selected as including the depth levels $z=1$ to $z=7$. The reason for this selection will be explained herein below. This top end bed is designated by $J=0$, so, by definition, $BB(0)=7$. The bed directly below the top end bed is designated by $J=1$ and its bed boundary index is designated by the last depth level in the bed, which happens to be $BB(1)=12$ for the particular illustration of FIG. 7. Each bed in the depth interval under consideration is designated in this manner. Another index denoted as BN(z) designates the bed number in which each depth level, z, lies. This index becomes useful in subsequent calculations. Referring to FIG. 9, there is shown a flow diagram for machine programming the selection of bed boundaries utilizing the variance values previously calculated. The block 130 sets up the top end bed as having a bed boundary index designation of $BB(0)=7$. The bed index J is next initialized at 1 (block 131) and the depth level index z is initialized at 9 (block 132). The BN(z) index is set equal to J (block 133), so that the first z considered ($z=9$) is specified as lying in the bed $J=1$. As z and J are later incremented, the function of block 133 is to store the appropriate bed location of each depth level.

During the next phase of the programmed method each depth level in the interval under consideration is examined to determine if a bed boundary is appropriate at such depth level. The criteria of boundary selection are such that successive boundaries must be at least two depth units apart and, therefore, the first depth level investigated for the possible presence of a boundary is $z=9$. As above stated, for purposes of the present embodiment a boundary is defined as existing when a local maximum occurs in the variance curve. This condition can be generally stated by the inequality $$V(z-1) < V(z) > V(z+1)$$

with this criteria being set forth by the decision diamond 134 of FIG. 9. When the variance at a particular depth level is found to be greater than the variance at either of the adjacent depth levels the "yes" output of diamond 134 is active and block 135 results in the effective generation of a boundary at the depth level being examined. This is accomplished by setting the next bed boundary index equal to such depth level. If, however, the criterion of diamond 134 is not met, the program is directed to the block 136 via the diamond 137, and the depth level index z is incremented by 1. In the case where a boundary has been found, J is incremented by 1 (block 138) and the incrementation of block 136 is again effected via diamond 137. The depth levels of successive boundaries are thus stored as the bed boundary index BB(J), with J being incremented by 1 each time a new boundary is sensed. This phase of the program continues until the decision diamond 136 indicates that the depth level $z=91$ has been reached, whereupon the last bed boundary is established at $z=93$ (block 139). A bottom end bed containing 7 depth units is thus established, for reasons which will become later apparent. The boundary at $z=93$ is the last boundary in the interval under consideration and is designated as $J_{max}$ (block 140). The depth levels in the top and bottom end beds are assigned respective BN(z) indices of 0 and $J_{max}+1$ (block 141). Also, the BN(z) indices for the depth levels $z=9$, 92 and 93 near the end beds are assigned the first and last bed numbers ($J=1$ and $J=J_{max}$) between the end beds.

Reviewing briefly to this point, at the completion of the routine of FIG. 9, there have been established a number of beds (including two end beds) ranging from $J=0$ to $J=J_{max}+1$ (see FIG. 7). The lower boundary of each bed J is designated by a bed boundary index, BB(J)=z, and each depth level in a bed is associated directly with such bed by an index BN(z)=J.

Having established the boundaries of a model, the next step is to select a trial conductivity values for each bed of the model (see curve 202 of FIG. 6). It has been found that a selection technique which is based on the examination of the derivative of the true measurement curve (curve 200) at the selected boundaries yields useful initial model values. The rules of selection are as follows:

(A) When the derivative is positive at the bed's upper boundary and negative at its lower boundary, the maximum log reading in the bed is selected. This situation is illustrated by case A of FIG. 10.

(B) When the derivative is negative at the bed's upper boundary and positive at its lower boundary, the minimum log reading in the bed is selected. This situation is illustrated by case B of FIG. 10.

(C) When the derivative has the same sign at the upper and lower boundaries, the log reading at the point of minimum variance in the bed is selected. This situation is illustrated by case C of FIG. 10.

Figure 10:
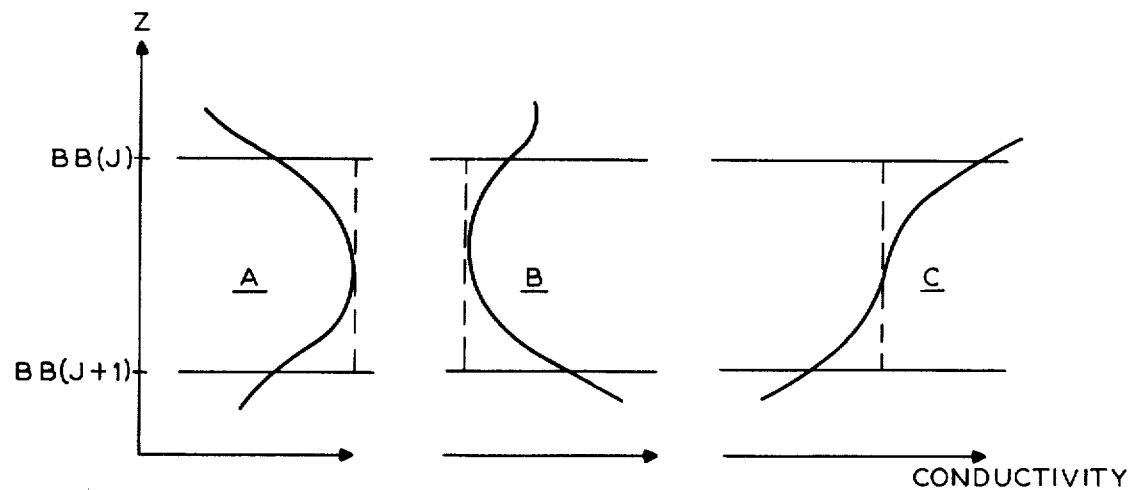
FIG. 10 shows three curves which illustrate the criteria for the selection of initial model bed conductivities.

In each case of FIG. 10 the dotted line depicts the conductivity selected for a particular bed depending upon the behavior of the derivative at the bed boundaries. The sketches of FIG. 10 are intended to illustrate the rationale behind the selection criteria and show that a reasonably representative value is generally obtained. It will be appreciated, however, that in certain situations the selection criteria may yield initial model values which do not apper so intuitively reasonable.

Figure 11:
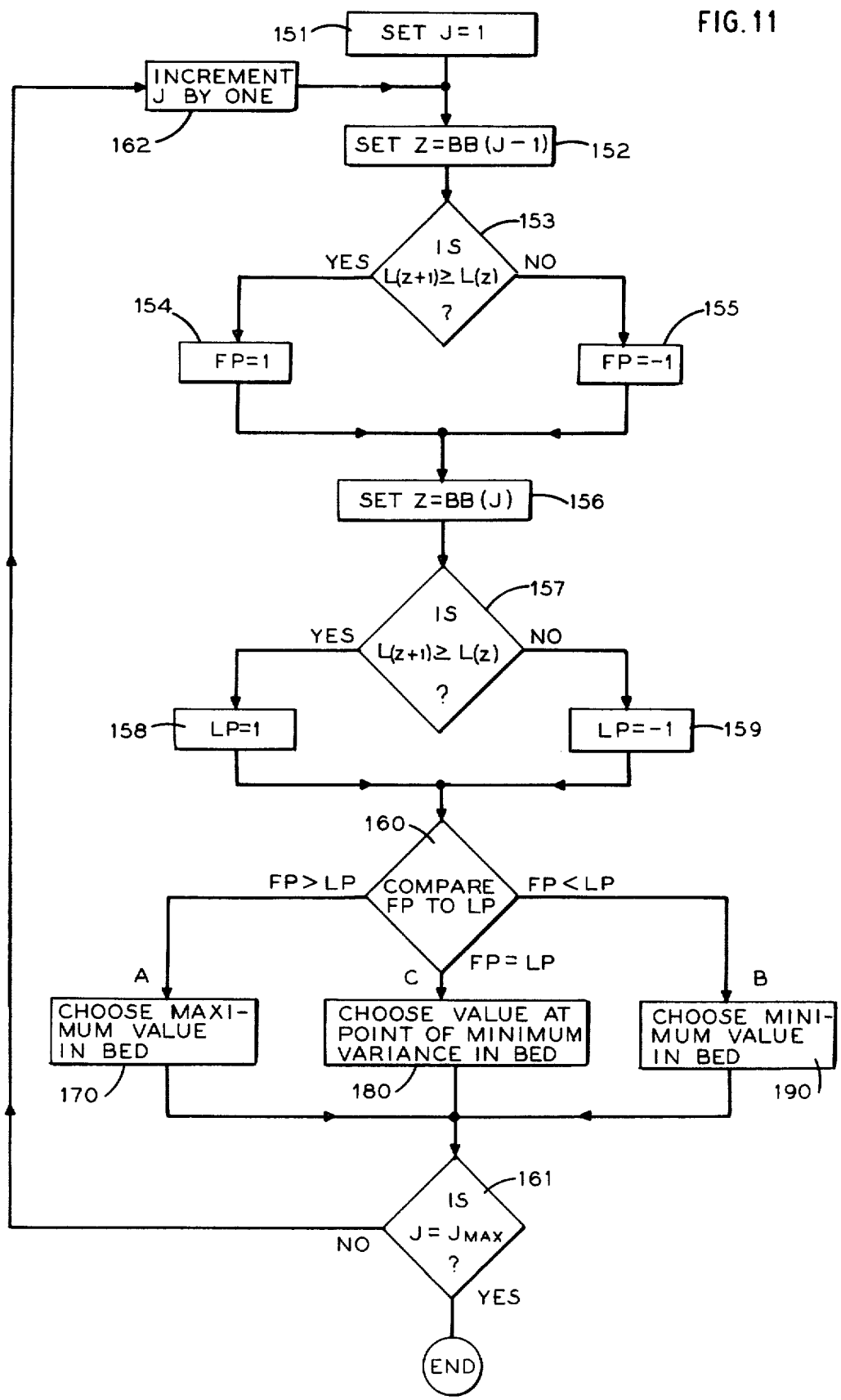
FIGS. 11 and 12 are flow diagrams for machine programming the selection of initial model bed conductivities.

Referring to FIG. 11, there is shown a flow diagram for machine programming the selection of initial model values in accordance with the criteria discussed in connection with FIG. 10. The bed index J is initialized at 1 (block 151) and the depth level index z is set to a depth level which lies directly above the bed being considered; i.e., $z=BB(J-1)$ (block 152). The derivative at the top boundary of the bed is next estimated by comparing the true measurement values at the depth level on either side of the bed boundary. This comparison is represented by the decision diamond 153. When $L(z+1)$ is greater than or equal to $L(z)$ the log reading is increasing as the boundary is crossed and the derivative is estimated as being positive. In this case an operator FP is set equal to 1 (block 154). For the case in which $L(z)$ is greater than $L(z+1)$ the derivative is estimated as a negative quantity and the operator FP is set equal to $-1$ (block 155). A similar operation is next performed at the lower boundary of the bed being considered. The depth level index is set to the last depth level in the bed (block 156) and the log reading at this point is compared with the log reading at the next depth level (diamond 157). Now, another operator, LP is set to either 1 or $-1$ depending on the polarity of the estimated derivative (blocks 158 and 159). The estimated derivatives at the top and bottom boundaries of the bed under consideration are then compared (block 160) and one of the three criteria corresponding to the cases A, B and C of FIG. 10 are selected by routing to one of the blocks 170, 180 or 190. The bed index J is then examined to determine if the last bed before the bottom end bed has been treated (diamond 161) and, if not, the bed index J is incremented by 1 (block 162) and the initial model value for the next bed selected in the same manner. The routine thus continues until initial model values for all beds between the end beds have been selected.

Figure 12:
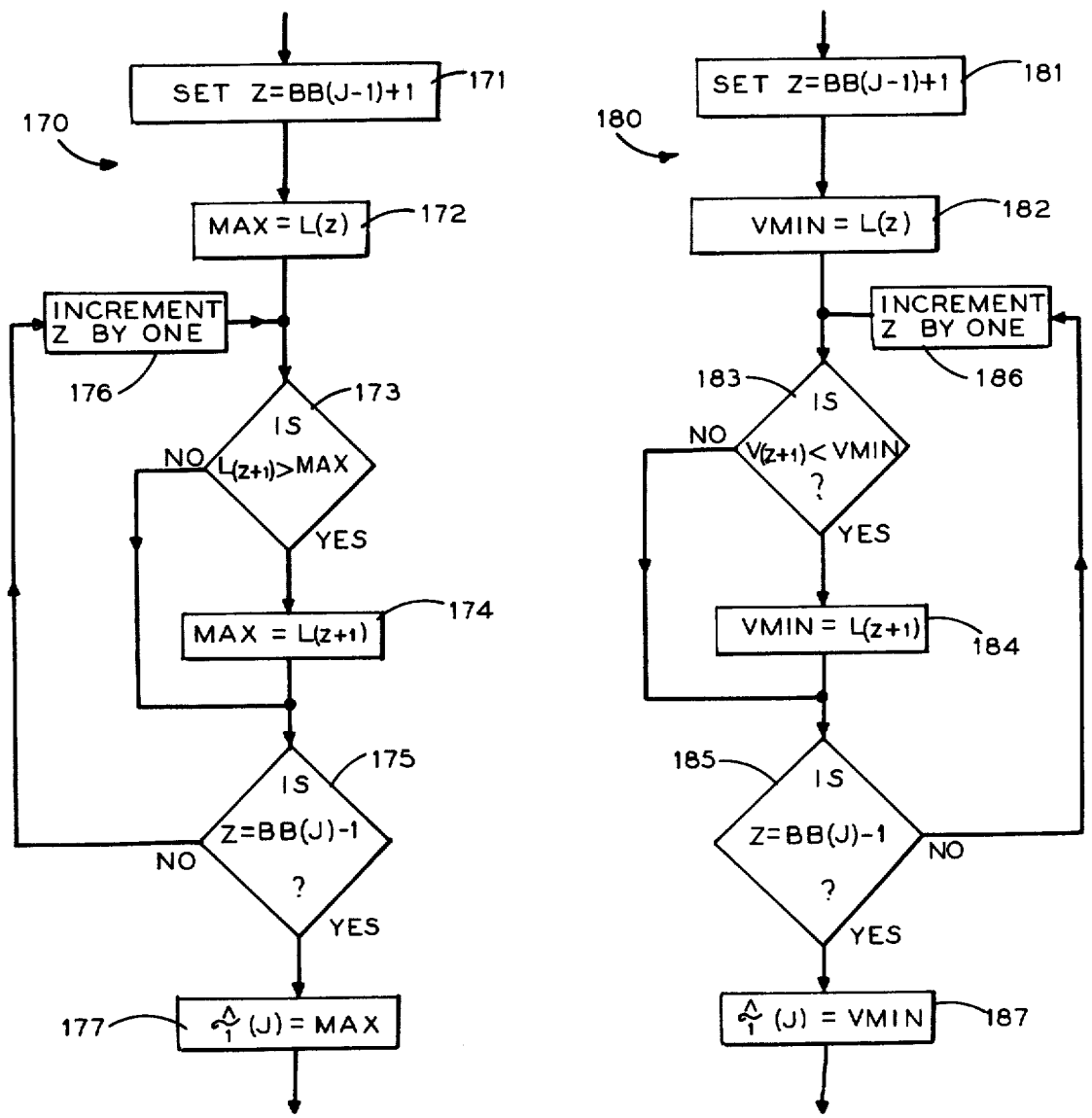

Referring to FIG. 12, there are shown flow diagrams for achieving the functions represented by the blocks 170 and 180 of FIG. 11. The routine 170 scans all log readings within a given bed J to determine the maximum log reading so that the initial model value in the bed can be set equal to this log reading. The depth level index z is set to the top depth level in the bed under consideration; i.e., $BB(J-1)+1$ (block 171). An operator MAX is set equal to the log reading at this depth level (block 172). The log reading at the next depth level is then compared to MAX (diamond 173) and, if the log reading at such depth level is greater, the operator MAX is changed to the greater value (block 174). The reading at each depth level in the bed is examined in this manner by virtue of the diamond 175 and the incrementation block 176, such that after having scanned all depth levels in the bed the value of MAX has been set equal to the highest log reading. The initial model conductivity in the bed, designated $\hat{\sigma}_1(J)$, is then set equal to the operator MAX (block 177).

The routine for the function of block 190 of FIG. 11 is the same as the routine of block 170 except that the log reading at each depth level is scanned for a minimum rather than a maximum. The routine for the function of block 180 is shown in FIG. 12 and is seen to also involve the scanning of all depth levels within the particular bed J being considered (block 181, diamond 185, and block 186). In this routine, however, the value of the log reading at the depth level having the smallest variance value associated with it is stored as the operator VMIN (block 182, diamond 183 and block 184), and the initial model conductivity in the bed is set equal to this operator value (block 187).

Figure 16:
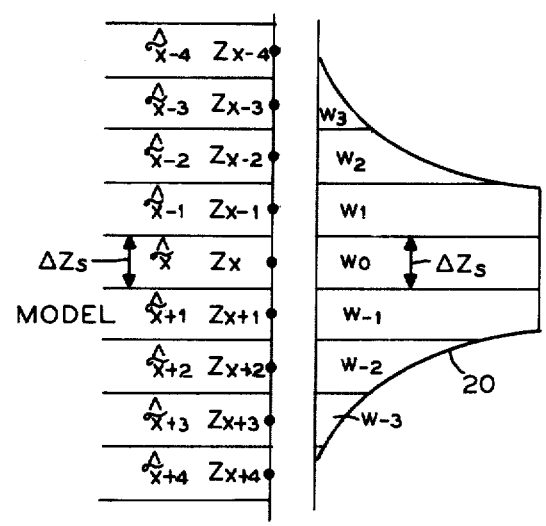
FIG. 16 shows a response curve alongside a particular model which is helpful in describing arrays utilized in an embodiment of the invention.

Referring again briefly to FIG. 5, the block 53 realizes the function of generating a simulated measurement value at a particular depth level, and it will be recalled that this is to be accomplished by applying the approximate response characteristic of the logging device to the model. When programming the computer to repeatedly perform this operation it is helpful to establish arrays which facilitate calculations in accordance with the above equation (2). In setting up these arrays, and recalling the discussion in connection with FIGS. 2 and 3, it is convenient to visualize the device response curve 20 as divided into a number of strips, each strip having a width equal to the sampling interval $\Delta z_s$. In FIG. 16 a response curve 20, divided in this manner, is pictured alongside a model which is divided into a plurality of thin "beds", each thin bed being one depth unit wide and having model conductivities as shown. This type of modeling is described in detail in the above-referenced copending application of F. Segesman. Using this model, a simulated measurement at the depth level $z_x$ can be conveniently calculated as $$\hat{L}(z_x) = w_3\hat{\sigma}_{x-3} + w_2\hat{\sigma}_{x-2} + w_1\hat{\sigma}_{x-1} + w_o\hat{\sigma}_x + w_{-1}\hat{\sigma}_{x+1} + w_{-2}\hat{\sigma}_{z+2} + w_{-3}\hat{\sigma}_{x+3}$$

where $w_3$ through $w_{-3}$ are the areas or "normalized geometrical weighting factors" of the strips of the device response curve 20. Using the notation of FIG. 16, it is seen that, in general, the contribution to the simulated measurement taken at a measure point depth level $z_x$ by a thin bed centered at a depth level $z_y$ is weighted by a factor $w_{x-y}$. For example, the contribution to the simulated measurement taken at a measure point $z_x$ by the bed at $z_{x-3}$ (i.e. letting $y = x - 3$) is $w_{x-(x-3)}$, or simply $w_3$. In view of this relationship, and having as input information the weighting factors $w_3$ through $w_{-3}$, a geometrical weighting factor notation designated "$w(z_x, z_y)$" can be established in the computer by calculating $$w(z_x, z_y) = w_{x-y}$$

for any measure point depth level $z_x$ with respect to a one-depth-unit-wide bed centered at a depth level $z_y$. A further condition is that $w(z_x, z_y) = 0$ when $|x - y| > 3$, which merely means that the geometrical factors of areas outside the effective device response are zero. The seven depth unit wide device response of FIG. 16 is utilized for convenience of illustration of the weighting factor notation. It will be understood, however, that the principles described in connection therewith are easily extendable to apply to longer and more practical device responses.

Figure 13:
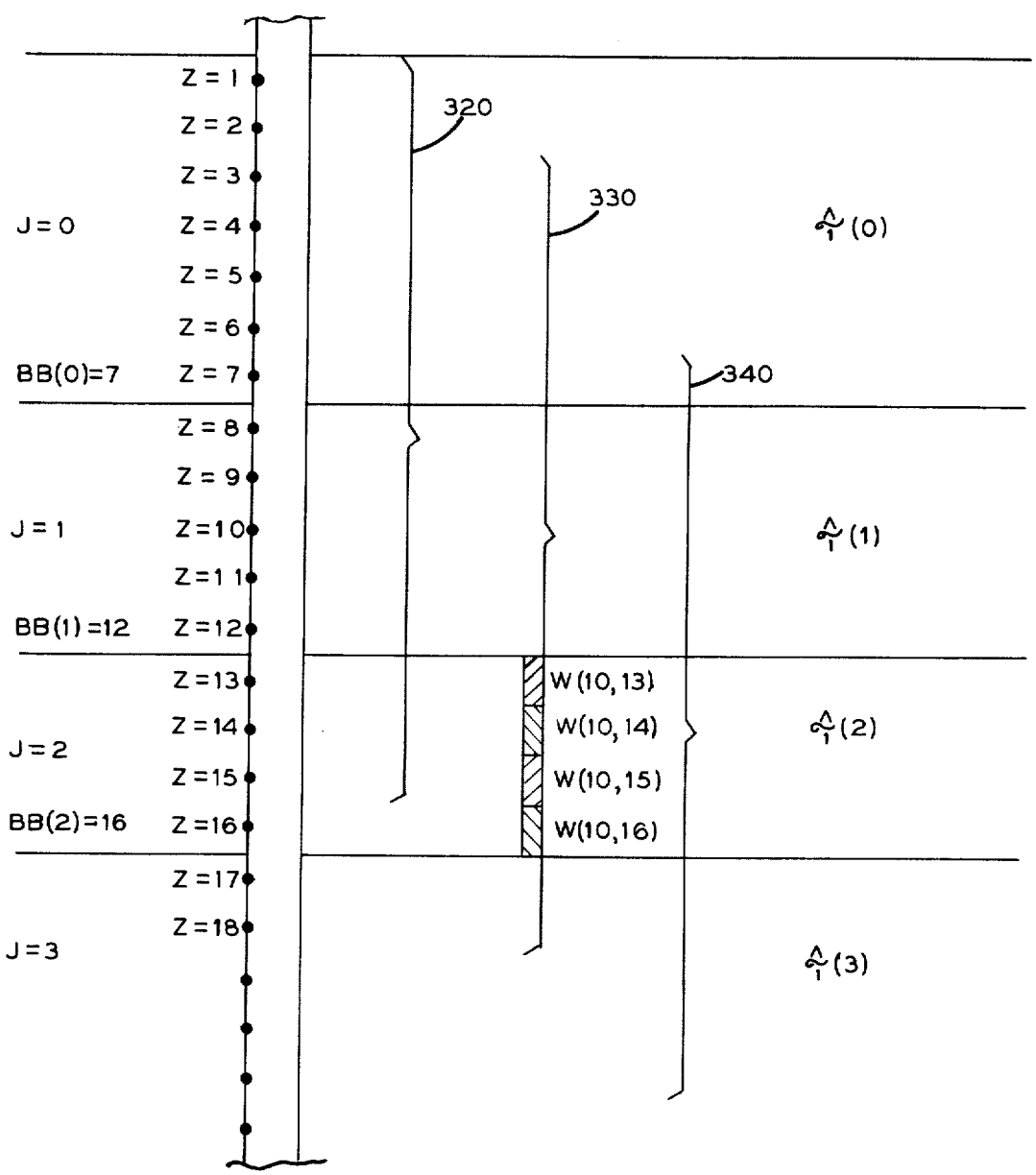
FIG. 13 shows a portion of a subsurface characteristic model and helps illustrate the technique of generating simulated measurements from a model.

FIG. 13 shows the top end of the given interval depicted in FIG. 7 with model beds having boundaries and initial conductivities as previously calculated. In generating simulated device responses for this embodiment it will be assumed for illustration that the effective device response extends over 15 depth units, although again it should be stressed that this parameter is easily varied. The rationale for designating top and bottom "end beds" which are seven depth units wide can now be visualized by considering the bracket 320 as representing the device response positioned for a measurement at the depth level $z = 8$. It is seen that simulated measurements taken at depth levels above $z = 8$ would require knowledge of conductivities outside the given interval. The same holds true for depth levels in the bottom end bed; i.e., depth levels below $z = 93$. The extent of the end beds can be determined for a given case by the effective span size of the logging device vertical extent. The portion of the given interval between the end beds is referred to hereinafter as the "main portion" of the given interval.

In the present embodiment, the initial model conductivities of the end beds are selected by averaging the true measurement values within these beds. Other approaches to handling end beds are described in the above-referenced copending applications of F. Segesman and W. Frawley et al. As was indicated above, simulated measurement values within the end beds are not completely obtainable from information within the given interval. Therefore, the initial model conductivities within the end beds are maintained throughout the present method and are not enhanced by iterative technique. It should be pointed out that later computed enhanced model conductivities for beds lying near the end beds depend somewhat on the end bed values and would not be expected to be as accurate as those nearer the center of the interval. Fortunately, the inaccuracies caused by such "end effects" are diminished towards the center of the interval, so the reliability of the final model could be increased, for example, by discarding the final model values for beds near the ends of the given interval and then using successively overlapping given intervals.

The weighting factor $w(z_x, z_y)$ established above can now be utilized in forming an array which is helpful in computer generating simulated measurement values. This array, designated $G(J, J_y)$ represents the geometrical factor of the $J_y^{th}$ bed with respect to a measure point in the $J^{th}$ bed. In the instant embodiment the measure point for a simulated measurement in any bed $J_x$ is taken at a depth level which is at or near the center of the bed. This procedure follows from the assumption that a measurement taken in the center of a bed is logically representative of the characteristic value of the bed. Specifically, when a model bed contains an odd number of depth units, the simulated measurement is taken at the central depth level of the bed. When a model bed contains an even number of depth units, no depth level falls exactly at the bed center; so the simulated measurement is taken at the first depth level directly above bed center. For example, the simulated measurement in the bed $J = 1$ (FIG. 13), which includes five depth units, is taken at the depth level $z = 10$ (bracket 330), whereas the simulated measurement in the bed $J = 2$, which includes four depth units, is taken at the depth level $z = 14$ (bracket 340).

A particular array member $G(J, J_y)$ can be calculated by summing the weighting factors in the bed $J_y$ with respect to the measure point in the bed J as $$G(J, J_y) = \Sigma w(z_x, z_y) \tag{4}$$

where the summation is taken over all $z_y$ in the bed $J_y$. To illustrate, the array member $G(1, 2)$ is calculated by summing the weighting factors in the bed $J = 2$ with respect to the measure point in the bed $J = 1$ ($z = 10$). The shaded areas under bracket 330 show the appropriate calculation to be $$G(1,2) = w(10,13) + w(10,14) + w(10,15) + w(10,16).$$

As further examples, the appropriate calculations for $G(1,1)$ and $G(2,1)$ are $$G(1,1) = w(10,8) + w(10,9) + w(10,10) + w(10,11) + w(10,12)$$

$$G(2,1) = w(14,8) + w(14,9) + w(14,10) + w(14,11) + w(14,12).$$

Figure 14:
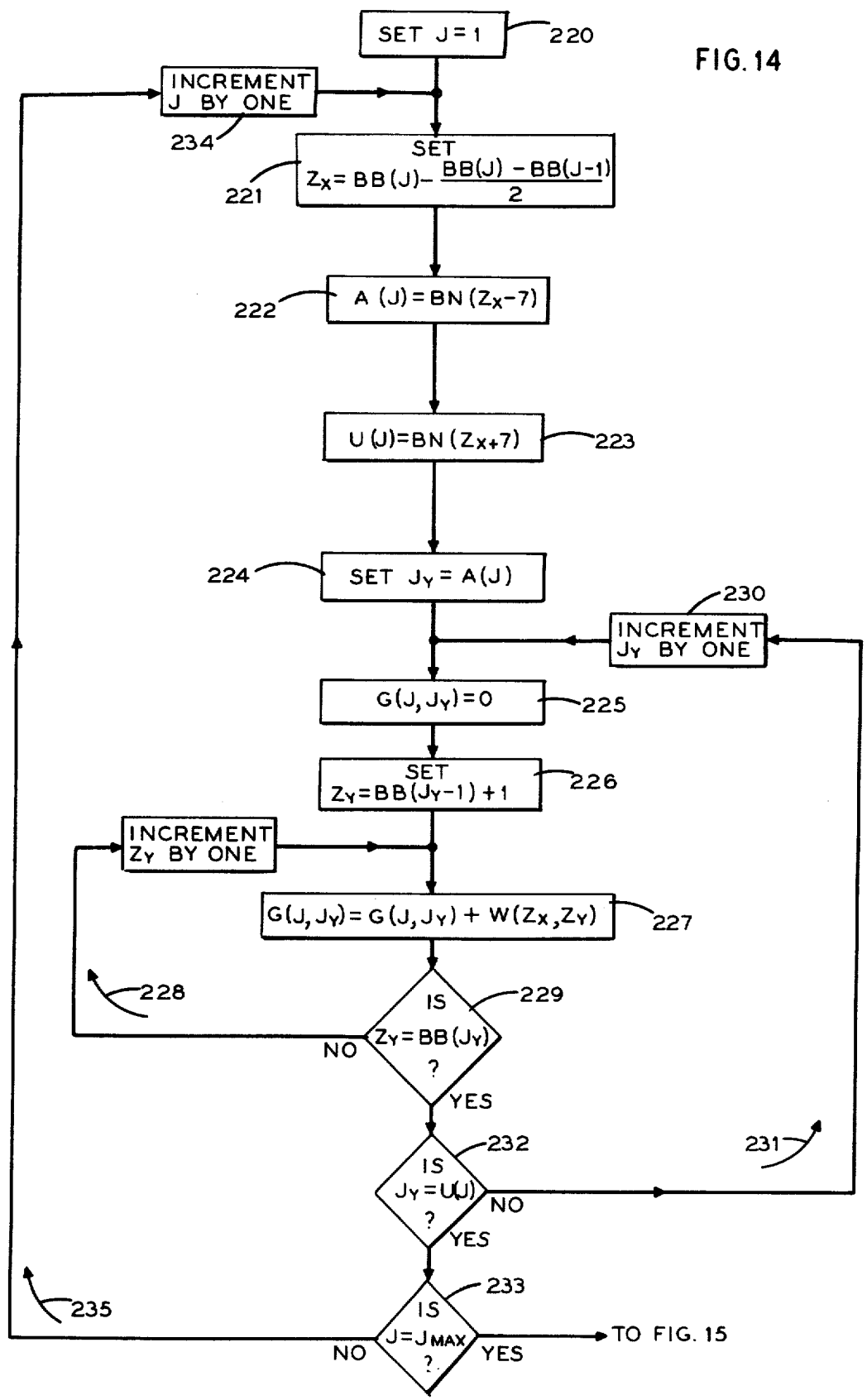
FIG. 14 is a flow diagram for machine programming the computation of array members utilized in generating simulated measurements from a model.

Referring to FIG. 14, there is shown a flow diagram for machine programming the computation of the array members $G(J, J_y)$ for a model whose boundaries have been previously calculated. (It is assumed that the weighting factors have been provided as inputs to the computer in the manner previously specified.) The bed index J is initialized at 1 (block 220) and the measure point within the bed J is set at the depth level $z_x$ in the center of the bed; i.e. at $$z_x = BB(J) - \frac{BB(J) - BB(J-1)}{2} \quad \text{(block 221)}.$$

When the bed J contains an even number of points the equation of block 221 yields the exact desired depth level $z_x$. When the bed J contains an odd number of points, however, the second term of the equation gives a result containing the decimal 0.5, and it is necessary for the second term to be rounded to an integer in order that the correct $z_x$ be obtained. For an integer mode, this rounding will generally be done automatically by the computer.

The block 222 represents the function of calculating the bed number of the highest bed above bed J which has an effect on the simulated reading taken in bed J. This highest bed number, designated A(J), is the bed number associated with the depth level which lies 7 depth units above $z_x$. Similarly, the bed number of the lowest bed which affects the reading in bed J is calculated as U(J) (block 223). The first bed whose geometrical factor with respect to bed J is to be calculated is set to $J_y = A(J)$ (block 224). $G(J,J_y)$ is initialized at zero (block 225), and the weighting point $z_y$ is set to the highest depth level in the bed $J_y$; i.e., $z_y = BB(J_y-1) + 1$ (block 226). The geometrical factor $G(J,J_y)$ is increased by the weighting factor $w(z_x,z_y)$, and by action of the loop 228 $G(J,J_y)$ is successively increased by each weighting factor in the bed $J_y$, this action continuing until $z_y$ reaches the lowest depth level in the bed $J_y$ (diamond 229). At the completion of the loop 228, $G(J,J_y)$ has attained the appropriate value as set forth in equation (4). $J_y$ is then incremented by one (block 230), and the next value of $G(J,J_y)$ computed in similar fashion. The loop 231 continues, with $G(J,J_y)$ being computed for all beds $J_y$ which affect the reading in bed J, until $J_y = U(J)$ (diamond 232). Then, J is examined to determine if all beds in the main portion of the given interval have been treated and, if not, J is incremented by one (block 234) and the values of $G(J,J_y)$ for the next bed J are computed. The main loop 235 continues in this manner until $G(J,J_y)$ values are computed for all beds in the main portion of the given interval.

Having computed the array of geometrical factors, an initial simulated measurement $\hat{L}(J)$ in any bed J can be calculated from the initial conductivity model as:

$$\hat{L}_1(J) = \Sigma \hat{\sigma}_1(J_y) G(J,J_y) \tag{5}$$

where the summation is taken over all beds $J_y$ which affect the simulated measurement in J. For reasons which will become apparent, it is useful to express equation (5) as $$\hat{L}_1(J) = \Sigma \hat{\sigma}_1(J_y) G(J,J_y) + \hat{\sigma}_1(J) G(J,J) \tag{6}$$

where the summation is take over all $J_y$ except for the bed in which the measurement is taken; i.e., except for $J_y = J$. The excepted $J_y$ is accounted for by the separate term $\hat{\sigma}_1(J) G(J,J)$. The simulated reading in the bed, $\hat{L}_1(J)$, can now be compared with the true measurement value, L(J), taken at the measure point in bed J. An "error value" E(J) is defined in this embodiment as a function of the comparison as follows:

$$E(J) = L(J) - \hat{L}_1(J). \tag{7}$$

The model value in the bed J is modified in accordance with the comparison, the preferred modification of this embodiment yielding a new model value in the bed, $\hat{\sigma}_2(J)$, which is defined by $$\hat{\sigma}_2(J) = \hat{\sigma}_1(J) + \frac{E(J)}{G(J,J)}. \tag{8}$$

The modification of the bed J in accordance with equation (8) gives a new model value which, if other model beds were to retain their present values, would yield a revised simulated measurement value that is equal to the true measurement value in bed J. This can be demonstrated by designating the revised simulated measurement value as $\hat{L}_1(J)_{rev.}$, and recalling the relationship of equation (6), we have $$\hat{L}_1(J)_{rev.} = \Sigma \hat{\sigma}_1(J_y) G(J,J_y) + \hat{\sigma}_2(J) G(J,J). \tag{9}$$

where the summation is again taken over all $J_y$ except $J_y = J$. Substituting for $\hat{\sigma}_2(J)$ in accordance with equation (8) makes the last term of equation (9) equal to $$\left[ \hat{\sigma}_1(J) + \frac{E(J)}{G(J,J)} \right] G(J,J).$$

Equation (9) thus simplifies to $$\hat{L}_1(J)_{rev.} = \Sigma \hat{\sigma}_1(J_y) G(J,J_y) + \hat{\sigma}_1(J) G(J,J) + E(J)$$

which, from equations (6) and (7) can be seen to be equal to L(J).

In the present embodiment, "enhanced" model values, $\hat{\sigma}_2(J)$, are calculated for all J in the main portion of the given interval in accordance with the equations (7) and (8). The new model obtained in this manner can then be similarly enhanced to produce model values designated $\hat{\sigma}_3(J)$ and the method continued iteratively a desired number of times. In general, for the $n^{th}$ model, the equations (7) and (8) become $$E_n(J) = L(J) - \hat{L}_n(J) \tag{10}$$

and $$\hat{\sigma}_{n+1}(J) = \hat{\sigma}_n(J) + \frac{E_n(J)}{G(J,J)}. \tag{11}$$

Referring to FIG. 15, there is shown a flow diagram for machine programming the iterative method of the instant embodiment. The iteration counting index n is initialized at one (block 250) and the bed index J is set to the first bed in the main portion of the given interval (block 251). $\hat{L}_n(J)$ is initialized at zero (block 252), and during the next phase of the program (indicated by the loop 253), $\hat{L}_n(J)$ is calculated in accordance with the relationship expressed by the equation (5) above. In so doing, $J_y$ is initialized at bed A(J) (block 254) and then successively incremented through all beds which affect the simulated measurement in bed J ending with $J_y = U(J)$ (block 255 and diamond 256). For each value of $J_y$, $\hat{L}_n(J)$ is increased by an amount $\hat{\sigma}_n(J_y) G(J,J_y)$ (block 257) until the desired sum is attained. The "error" value associated with the bed J is then computed in accordance with equation (1) (block 258) and the conductivity value in bed J is modified in accordance with equation (11) (block 259). The method is then repeated for all other beds J in the main portion of the given interval (diamond 260 and block 261) as indicated by the loop arrow 262. When an entire new model has been generated, the index n is examined (diamond 263) to determine if further iterations are desired, and, if not, the latest model values $\hat{\sigma}_{n+1}(J)$ are printed out (block 264). Alternatively, the errors $E_n(J)$ for a given model can be sampled to decide if further iterative enhancement is to be performed.

The foregoing method of model generation has been described with reference to data processing techniques preferably implemented by the programming of a general purpose digital computer. However, it is to be understood that the method of the present invention could be implemented with other calculating apparatus, for example a special purpose analog or digital computer constructed to perform the described steps. Also, while an induction logging device has been used to illustrate the invented method, it should be again stressed that the invention also applies to other types of subsurface investigation devices.

What is claimed is:

1. A well logging method of producing a representation mapping the relative arrangement of subsurface earth formation beds with respect to a subsurface characteristic measured with a well logging device, comprising:
    (a) producing initial well logging measurements for particular depths in the formation derived from measurements taken in a well in the formation with the well logging device over a given depth interval;
    (b) producing a trial variation of the subsurface characteristic, said trial variation varying in discrete steps corresponding to discretely-boundaried subsurface earth formation beds, said boundaries being based on measurements of the subsurface characteristic;
    (c) generating, by a computer, a new well logging measurement for a particular depth level for which there is an initial well logging measurement, by applying the approximate response characteristic of the logging device to the trial variation of the subsurface characteristic;
    (d) comparing, by a computer, the new well logging measurement at the particular depth level to the initial measurement value at that depth level; and
    (e) modifying, by a computer, the trial variation of the subsurface characteristic in accordance with the comparison to thereby produce a visual or a stored representation mapping the relative arrangement of discretely boundaried subsurface earth formation beds.

2. A well logging method as in claim 1 wherein the steps (c) through (e) are repeated for other particular depth levels within the given depth interval in the well.

3. A well logging method as in claim 2 wherein the steps (c) through (e) are repeated for the particular depth levels in an iterative fashion.

4. A well logging method as in claim 2 wherein the trial variation is derived from said initial well logging measurements taken with the well logging device.

5. A well logging method as in claim 2 wherein said boundaries of the beds of the trial variation are selected at maxima of the variance of said subsurface characteristic measurements on which the boundaries are based.

6. A well logging method as in claim 5 wherein said last recited subsurface characteristic measurements are the initial well logging measurements derived from the well logging device.

7. A well logging method as in claim 2 wherein the trial variation is selected as a function of the behavior of the rate of change of the subsurface characteristic measurements at the bed boundaries.

8. A well logging method as in claim 7 wherein the last recited subsurface characteristic measurements are the initial well logging measurements derived from the well logging device.

9. A well logging method as in claim 1 wherein said trial variation is modified by modifying the characteristic value in the particular model bed of the trial variation in which the particulr depth level is located.

10. A well logging method as in claim 9 wherein the steps (c) through (e) are repeated for other particular depth levels within the given depth interval.

11. A well logging method as in claim 10 wherein the steps (c) through (e) are repeated for the particular depth levels in an iterative fashion.

12. A well logging method as in claim 9 wherein the modifying step includes modifying the characteristic value in the particular of the trial bed such that a revised new measurement for the particular depth, generated by applying the approximate response characteristic of the well logging device to the modified trial variation, would be equal to the initial well logging measurement at the particular depth level.

13. A well logging method as in claim 11 wherein the steps (c) through (e) are performed for other particular depth levels within the given depth interval.

14. A well logging method as in claim 13 wherein the steps (c) through (e) are repeated for the particular depth levels in an iterative fashion a selected number of times, and including producing a plot of the most recent modification of the trial variation.

15. A well logging method of computer generating a representation mapping the arrangement, relative to a subsurface characteristic, of discretely boundaried subsurface earth formation beds which is substantially consistent with measurements taken in a well in the formation with a well logging device, comprising:
    (a) measuring said subsurface characteristic with the well logging device to produce a set of initial well logging measurements over a given depth interval of the well;
    (b) selecting a trial variation of the subsurface characteristic, the trial variation including discretely-boundaried beds, the boundaries being based on subsurface characteristic measurements;
    (c) generating a new well logging measurement at a particular depth level by applying the approximate response characteristic of the logging device to the trial variation;
    (d) comparing the new well logging measurement at the particular depth level to the initial measurement value at that depth level; and
    (e) modifying the trial variation in accordance with the comparison to produce a visual or a stored record of said representation mapping the arrangement of subsurface earth formation beds.

16. A well logging method as in claim 15 wherein the steps (c) through (e) are repeated for other particular depth levels within the given depth interval.

17. A well logging method as in claim 16 wherein the steps (c) through (e) are repeated for the particular depth levels in an iterative fashion.

18. A well logging method as in claim 16 wherein the trial variation is originally selected from the initial well logging measurements.

19. A well logging method as in claim 16 wherein said boundaries of the trial variation are selected at maxima of the variance of said subsurface characteristics measurements.

20. A well logging method as in claim 19 wherein said subsurface characteristic measurements are the initial well logging measurements.

21. A well logging method as in claim 16 wherein the trial variation is selected as a function of the behavior of the rate of change of the subsurface characteristic measurements at the bed boundaries.

22. A well logging method as in claim 21 wherein the subsurface characteristic measurements are the initial well logging measurements.

23. A well logging method as in claim 15 wherein said trial variation is modified by modifying the subsurface characteristic in the particular model bed in which the particular depth level is located.

24. A well logging method as in claim 23 wherein the steps (c) through (e) are repeated for other particular depth levels within the given depth interval.

25. A well logging method as in claim 24 wherein the steps (c) through (e) are repeated for the particular depth levels in an iterative fashion.

26. A well logging method as in claim 23 wherein the subsurface characteristic in the particular trial variation bed is modified such that a revised new well logging measurement for the particular depth level, generated by applying the approximate response of the well logging device to the so-modified trial variation, would be equal to the initial measurement at the particular depth level.

27. A well logging method as in claim 26 wherein the steps (c) through (e) are repeated for other particular depth levels within the given depth interval.

28. A well logging method as in claim 27 wherein the steps (c) through (e) are repeated for the particular depth levels in an iterative fashion a selected number of times, and including producing a plot of the most recently modified trial variation.

29. A well logging method of generating a representation mapping the arrangement of discretely boundaried subsurface earth formation beds with respect to subsurface characteristic, which representation is substantially consistent with well logging measurements taken in a well in the formation with a well logging device, comprising:
   (a) deriving a set of initial well logging measurements derived from the well logging device while moving the device through the well over a given depth interval of the well;
   (b) programming and operating a computer to select a trial variation of the subsurface characteristic, the model including discretely-boundaried beds, the boundaries being based on subsurface characteristic measurements;
   (c) programing and operating the computer to generate a new well logging measurement at a particular depth level by applying the approximate response characteristic of the logging device to the trial variation;
   (d) programming and operating the computer to compare the new well logging measurement at the particular depth level to the initial well logging measurement at that depth level; and
   (e) programming and operating the computer to modify the trial variation in accordance with the comparison to thereby generate a visual or a stored record of said representation.

30. A well logging method as in claim 29, including programming and operating the computer to perform the steps (c) through (e) for other particular depth levels within the given depth interval.

31. A well logging method as in claim 30 including programming and operating the computer to repeat the steps (c) through (e) for the particular depth levels in iterative fashion.

32. A well logging method as in claim 31 where the steps (c) through (e) are repeated for the particular depth levels a selected number of times, and including producing a plot of the most recently modified trial variation.

33. A well logging method of computer generating a representation mapping the arrangement of discretely boundaried subsurface earth formation beds with respect to subsurface conductivity, which representation is substantially consistent with conductivity measurements taken in a well in the formation with an induction logging device, comprising:
   (a) deriving a set of initial measurements of electrical conductivity in the well derived from the induction logging device while the device moves through the well over a given depth interval;
   (b) selecting a trial variation with depth of the subsurface conductivity, the trial variation including discretely-boundaried beds, the boundaries being based on subsurface conductivity measurements;
   (c) generating a new conductivity measurement at a particular depth level by applying the approximate response characteristic of the induction logging device to the trial variation;
   (d) comparing the new conductivity measurement at the particular depth level to the initial conductivity measurement at that depth level; and
   (e) modifying the trial variation in accordance with the comparison to generate a visual or a stored record of said representation.

34. A well logging method as in claim 23 wherein the steps (c) through (e) are performed for other particular depth levels within the given depth interval.

35. A well logging method as in claim 34 wherein the steps (c) through (e) are repeated for the particular depth levels in an iterative fashion a selected number of times, and including plotting the most recently modified trial variation.

36. A well logging method of computer generating a trial variation with depth of a subsurface characteristic for discretely-boundaried earth formation beds comprising:
   (a) deriving a set of initial well logging measurements of the subsurface characteristic taken at various depth levels over a given depth interval in a well in the earth formation;
   (b) generating a set of variances from said initial well logging measurements; and
   (c) selecting bed boundaries for the trial variation at the depth levels corresponding to maxima in said set of variance values to thereby generate said trial variation for discretely-boundaried beds.

37. A well logging method as in claim 36 wherein the trial variation characteristic within a given bed is selected as a function of the rate of change of said initial well logging measurements at the boundaries of the given bed.

38. A system for computer generating a representation, with respect to a subsurface characteristic, of the arrangement of discretely-boundaried earth formation beds, which representation is substantially consistent with measurements taken in a well in the formation with a well logging device, comprising:
   (a) means for deriving a set of initial well logging measurements from the output of a well logging device moved through a well in the formation over a given depth interval; and (b) means for producing a trial variation with depth of the subsurface characteristic, the trial variation including discretely-boundaried beds, the boundaries being based on subsurface characteristic data, generating a new well logging measurement at a particular depth level by applying the approximate response characteristic of the logging device to the trial variation, comparing the new well logging measurement at the particular depth level to the initial measurement at the depth level, and modifying the model in accordance with the comparison to generate a visual or a stored record of said representation.

39. A method of exploring a subsurface earth formation comprising:

(a) producing initial well logging measurements derived from a well logging device passed over a given depth interval through a well in the subsurface earth formation and operated to take said initial measurements of a characteristic of the earth formation adjacent the well at selected depths in the well, said logging device having a selected approximate response characteristic;

(b) producing a selected trial variation of the same subsurface characteristic, said trial variation varying in discrete steps corresponding to discretely-boundaried subsurface earth formation beds, said boundaries being based on measurements of the same subsurface characteristic;

(c) generating new well logging measurements for said depths in the well, by applying the approximately response characteristic of the well logging device to said selected trial variation;

(d) comparing the new and initial well logging measurements at respective depths in the well;

(e) modifying the selected trial variation in accordance with the comparison to produce a new selected trial variation capable of yielding further new well logging measurements, conforming more closely to the initial well logging measurements, when the response characteristic of the well logging device is applied to the new selected trial variation; and (f) plotting the new selected trial variation of the measured characteristic versus depth in the well to thereby produce a visual or a stored plot of the arrangement of subsurface earth formation beds with respect to said characteristic of the subsurface formation.

* * * * *